(12) United States Patent
Walter

(10) Patent No.: US 6,211,950 B1
(45) Date of Patent: Apr. 3, 2001

(54) OPTICAL PULSE REFLECTOMETER

(75) Inventor: Herbert Walter, Zwingenberg (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/308,729

(22) PCT Filed: Nov. 11, 1997

(86) PCT No.: PCT/DE97/02629

§ 371 Date: Jul. 26, 1999

§ 102(e) Date: Jul. 26, 1999

(87) PCT Pub. No.: WO98/23937

PCT Pub. Date: Jun. 4, 1998

(30) Foreign Application Priority Data

Nov. 29, 1996 (DE) .............................................. 196 49 594

(51) Int. Cl.⁷ .................................................................. G01N 21/00
(52) U.S. Cl. ............................................................... 356/73.1
(58) Field of Search ............................ 356/73.1; 385/12, 385/13, 27, 39–42, 16

(56) References Cited

U.S. PATENT DOCUMENTS

| | | |
|---|---|---|
| 4,737,027 | 4/1988 | Maeda . |
| 5,319,266 | 6/1994 | Chu et al. . |
| 5,388,172 | 2/1995 | Anderson . |

FOREIGN PATENT DOCUMENTS

| | | |
|---|---|---|
| 44 37 821 | 4/1995 | (DE) . |
| 0 468 412 | 1/1992 | (EP) . |
| 0 502 422 | 9/1992 | (EP) . |
| 61-260228 | 11/1986 | (JP) . |
| WO 91/12509 | 8/1991 | (WO) . |

OTHER PUBLICATIONS

*Hisao Kawashima et al., A Low Crosstalk and Polarization Independent Optical Waveguide Switch for OTDR, NEC Research & Development (1990) Oct., No. 99, pp. 75–88.
*S.K. Das et al., Optical Time–Domain and CW Techniques Measure Lightwave Reflectance, Laser Focus, Dec. 1998 No. 12, pp. 129–134.
*Patent Abstracts of Japan, vol. 11, No. 112 (P–565), Apr. 9, 1987 & JP61260228, Nov. 18, 1986.
*N. Keil, "Optische Schalter aus Kunststoff—Schlüsselkomponenten in den Telekom–Netzen der Zukunft" [Optical switches made of plastic—Key components in the telecom networks of the future], ntz, issue 12/1995, pp. 36–41.

Primary Examiner—Frank G. Font
Assistant Examiner—Amanda Merlino
(74) Attorney, Agent, or Firm—Kenyon & Kenyon

(57) ABSTRACT

An optical pulse reflectometer includes switch for selectively connecting a light source to an associated test object and for selectively connecting the test object to an associated photodetector (70). The power utilization and thus the sensitivity is improved over conventional optical pulse reflectometers.

7 Claims, 2 Drawing Sheets

OPTICAL PULSE REFLECTOMETER

FIELD OF THE INVENTION

The present invention relates to an optical pulse reflectometer.

RELATED TECHNOLOGY

The ongoing establishment and expansion of optical fiber networks calls for the use of suitable optical measuring instruments during installation, for maintenance purposes and for the monitoring thereof. A particularly important measuring instrument in this connection is the optical pulse reflectometer, known also as the optical time-domain reflectometer (OTDR). Such a measuring instrument is used to measure and evaluate reflections in optical fiber transmission systems. Reflections occur in optical components, such as in a light-conducting fiber, principally because of points of sudden irregularity in the refractive index, for example at the end of the fiber, and as a result of Rayleigh scattering, caused by inhomogeneities of the fiber. Further examples of reflecting optical components are connectors, junctions and splices. In a known optical pulse reflectometer, the pulses emitted by a laser diode are supplied via a static or passive power splitter to the fiber to be measured. The static power splitter, known also as a beam splitter, may be in the form of a semi-opaque reflector, an optical fiber 2×2 coupler (known also as a directional coupler) or a 2:1 coupler, i.e., an inversely operated Y-junction. The function of the passive beam splitter is to change the propagation direction of the light pulse, i.e., to direct the light pulses spatially. The latter is necessary to ensure that the optical signal components, reflected by the fiber due to Rayleigh and/or Fresnel scattering, are directed onto a photodetector. However, the passive beam splitter has the disadvantage that approximately only half of the reflected signal component is returned to the photodetector. The other half of the reflected signal component is directed in an undesired manner towards the laser diode, with the consequence that an optical isolator must be additionally connected upstream from the laser diode to protect against the undesired reflections.

Furthermore, the reflected light component is additionally attenuated by inevitable imperfections in the fiber connections. If, instead of an inversely operated Y-branch, passive 2×2 couplers or semi-opaque reflectors are used, it is even so that only about one fourth of the light intensity emitted by the laser diode is utilized. In other words, the signal emitted by the laser diode is attenuated by a factor of 4 before it reaches the photodetector.

German Patent Application No. A-4 437 821 describes a shielding device for an optical time-domain reflectometer, also known as an OTDR, which uses a high-speed switch and a pumped light source for producing optical pulses. The essential function of the high-speed switch is to selectively block a frequency range of the light reflected by the fiber to be measured, the light also being described as Fresnel-reflected light. To achieve this, the optical high-speed switch is operated synchronously with the optical pulse produced by the light source.

U.S. Pat. No. 5,388,172, describes an optical switching device for an OTDR, where a pulsed laser and an optical receiver are connected to a fiber to be measured. The optical switching device performs the function of keeping the Fresnel reflections from the fiber away from the optical receiver.

European Patent Application No. A 0 502 422 describes an optical time-domain reflectometer, in which a Raman laser device and an optical detector are connected via an optical switch to the fiber to be measured. To be able to measure the loss properties of the optical fiber at any wavelength at all, within a broad spectrum, a Raman scattered-light pulse is used. For this, the Raman laser device uses a solid-state laser, which is pumped by a laser diode to produce a light pulse.

The International Patent Application having International Publication No. WO-A 91 12509 describes an OTDR which uses a pulsed laser to produce light pulses. The pulsed laser and an optical receiver are connected via a passive optical coupler to a fiber to be measured.

In the essay, "A Low Crosstalk and Polarization Independent Optical Waveguide Switch for OTDR", NEC Research and Development, no. 99, October 1990, Tokyo, Japan, pp. 75–83, XP000178479, H. Kawashima et al. describe an optical waveguide switch for an OTDR that works with a wavelength of 1.3 $\mu$m, with a Ti:LiNbO$_3$ waveguide. As a light source, a laser diode is used, in turn, which produces light pulses.

SUMMARY OF THE INVENTION

An object of the present invention, therefore, is to further develop the optical pulse reflectometer described at the outset so as to enable the circuit expenditure and, thus, the costs to be reduced by eliminating the need for synchronization between the light source and the control device used for switching the optical switch.

The object of the invention, therefore, is to further develop the initially described optical pulse reflectometer in such a manner that its sensitivity can be improved without increasing the optical transmitting power of the light source and such that it is not necessary to employ an additional optical isolator to protect the light source from reflections.

The optical pulse reflectometer according to the present invention includes at least one—generally known—optical switch for selectively connecting of a light source, particularly a laser diode, to an associated test object and for the selectively connecting to the test object to an associated photodetector. The optical switch is switched, for example, by a control device which switches the optical switch at predetermined points in time. In this manner, the optical transmitting power of the light source is injected virtually without loss of power into the test object, in particularly an optical fiber, and that the light reflected in the test object is subsequently supplied virtually unattenuated to the photodetector. Thus, without having to actually increase the optical transmitting power of the light source, it is possible, inter alia, to test fibers over greater lengths than in known methods heretofore using static power splitters. In addition, for a measured distance of a given length, it is possible to employ shorter light pulses, thereby enhancing the spatial resolution of the measurement. Since, compared, for example, to passive 2×2 couplers or semi-opaque reflectors, an optical switch allows approximately four times the power utilization, the pulse duration for detecting Rayleigh scattering can be reduced to one fourth. (Note that the intensity of the Rayleigh scattering is a function of the energy (light intensity×pulse duration) of the pulse.) For OTDR measurements, this means that significant points on the fiber can be located with greater accuracy. Consequently, for example, faults on a fiber cable can be pinpointed with suitable accuracy. Due to the higher signal level, Fresnel reflections also produce correspondingly stronger echo signals in the photodetector, which are, therefore, also able to be detected with greater sensitivity. In contrast to a conventional optical pulse reflectometer, the optical switch virtually eliminates the need for an optical isolator for protecting the light source from reflections. This is due to the fact that virtually all of the reflected signal component is directed to the photodetector.

The optical switch used may, for example, be a 2×2 directional coupler or an acoustooptic modulator, both of which are in effect known. An example of a switchable optical 2×2 directional coupler is the thermooptically controlled coupler, described by Norbert Keil in the essay "Optische Schalter aus Kunststoff—Schlüsselkomponenten in den Telekom-Netzen der Zukunft" [*Optical switches made of plastic—Key components in the telecom networks of the future*], ntz, issue December 1995, pages 36–41. As a light source, the optical pulse reflectometer uses a light source operated in constant light mode, the switchable optical switch also being used to produce light pulses. In this case, the pulse frequency and pulse duration of the light pulses is stipulated by a control device which by drives the optical switch accordingly. Operating a light source in a constant light mode has many advantages over an operation with a pulsed light source. The need is eliminated for synchronization between the light source and the control device used for switching over the optical switch. In addition, the voltage spikes produced by an electrical pulse generator can no longer have an adverse effect on the light source. Moreover, more modest time requirements can be placed on the light source with respect to a fast modulation for producing short enough pulses.

To ensure that all the reflections produced by the test object are directed to the photodetector and can, thus, be evaluated by the optical pulse reflectometer, the optical test pulse must have completely propagated through the optical switch before the switch can be switched. This is achieved by a launching fiber of predetermined length which is connected between the optical switch and the test object. The length of the launching fiber must be $1 \geq cT$, where c is the speed of the light in the launching fiber and T is the longest pulse duration of a pulse which can be emitted from the optical pulse reflectometer. Consequently, the launching fiber acts as a delay line for the reflected light pulses.

To prevent light reflections produced by the unused connection of the optical switch from being reflected the light source or radiation produced by the same from being radiated to the ambient environment, the unused connection of the optical switch is terminated with an absorber and an optical shield. In the case of a 2×2 coupler, the absorber may be formed from a plurality of very narrow turns (having a diameter of a few mm) of the fiber section that is not terminated. Suitable plastic sleeves may be used as shielding.

Connected in known manner between the photodetector and a display device is a data preparation device, which includes a known Boxcar averager, as well as a logarithm converter.

BRIEF DESCRIPTION OF THE DRAWINGS

In the following, the present invention is explained in greater detail in conjunction with the appended drawings, in which.

DETAILED DESCRIPTION

Figure 1:
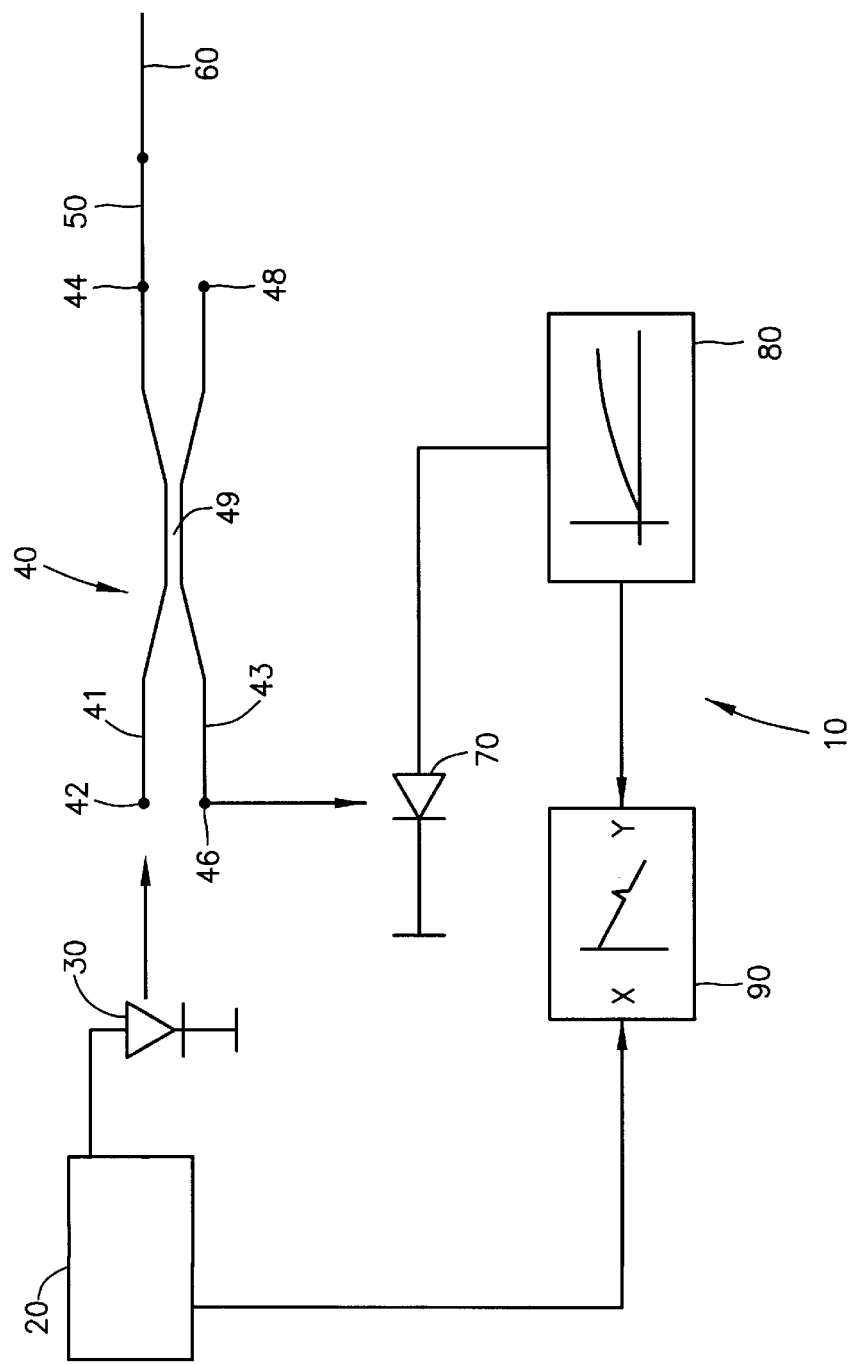
FIG. 1 shows a greatly simplified block diagram of an optical pulse reflectometer according to the present invention.
Figure 2:
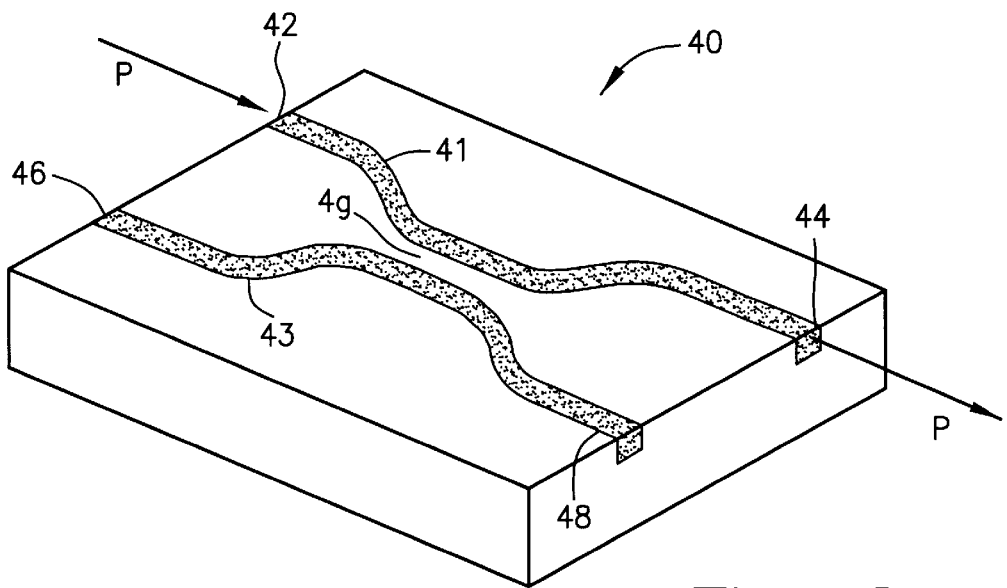
FIG. 2 shows a switchable optical 2×2 directional coupler in the straight-ahead state for use in the optical pulse reflectometer according to FIG. 1.
Figure 3:
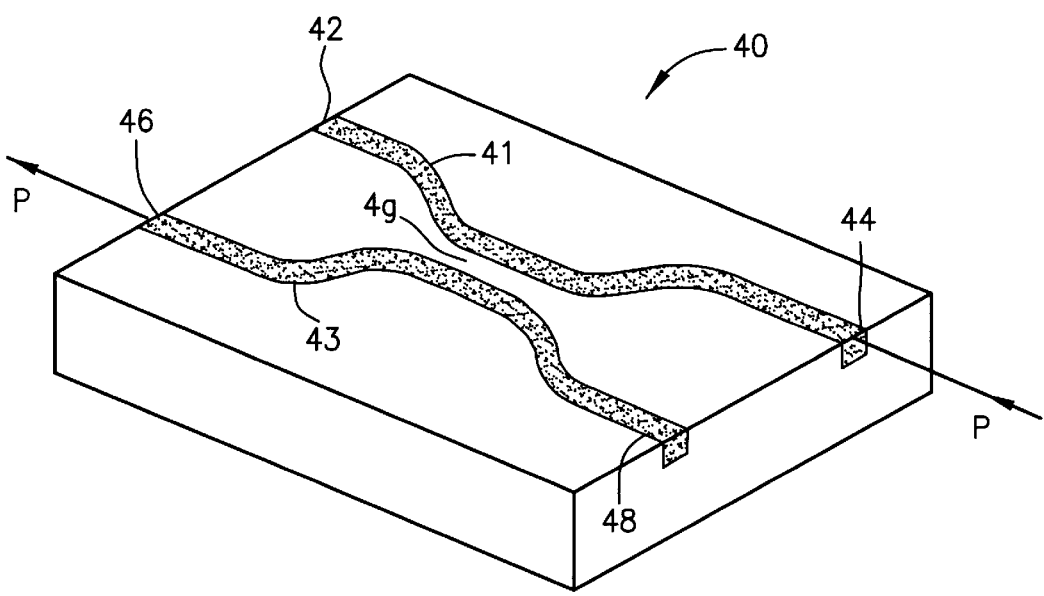
FIG. 3 shows the switchable optical 2×2 directional coupler presented in FIG. 2 in the crossed-over state.

FIG. 1 shows an optical pulse reflectometer, known also as an optical time-domain reflectometer (OTDR). The pulse reflectometer, identified in general with the reference numeral 10, includes a generally known pulse generator 20, the pulse generator 20 being tunable with respect to pulse duration and wavelength and driving, for example, a laser diode 30. Connected downstream from laser diode 30 is a switchable optical switch 40, which is switched over in response to switching signals produced by a control device (not shown). In the example described herein, switch 40 is a 2×2 directional coupler, as shown in FIGS. 2 and 3, which can be switched by means of an electric voltage. The 2×2 directional coupler 40, which is available, for example, in integrated optical design, includes two light conducting strands 41 and 43 disposed at a predetermined distance from each other. In a middle region 49, the two strands 41 and 43 come so close to each other that the 2×2 directional coupler can be selectively switched. Depending on the physical controlled variable, the 2×2 directional coupler is either in the straight-ahead state (see FIG. 2) or in the crossed-over state (see FIG. 3). On the side pointing to laser diode 30, strand 41 has a port 42, used as an input, and, on the opposite side, a port 44, used both as an output and also as an input. On the side pointing to laser diode 30, strand 43 has a port 46, acting as an output, and on the opposite side, an unused port 48. To prevent light pulses from being reflected to laser diode 30 or being radiated to the ambient environment, port 48 may be terminated with a shield and an absorber (not shown). The absorber may be formed from a plurality of very narrow turns of the fiber section of strand 43, on which port 48 is located. The optical test pulses produced by laser diode 30 are injected into input port 42 of strand 41. Port 44 of strand 41 is connected to a launching fiber 50. Connected to launching fiber 50 is a test object, particularly an optical fiber 60, referred to in the following as a test fiber. A photodetector 70 is connected to output port 46 of strand 43 of the 2×2 directional coupler 40. Photodetector 70 is, for example, a photodiode (e.g., an avalanche photo diode—APD). Photodiode 70 converts the optical echo pulse received through output port 46 into an electric signal. Photodiode 70 is connected on the output side to a data evaluation device 80 containing a generally known Boxcar averager and a logarithm converter. The purpose of the data evaluation device 80 is to process a plurality of received echo pulses into an amplified and easily displayable signal. The output of data evaluation device 80 is connected to the first input of an oscilloscope 90 on which the echo pulses produced in test fiber 60 are displayed. Connected to the second input of oscilloscope 90 is pulse generator 20 which synchronizes oscilloscope 90 to laser diode 30.

The following briefly explains the operating principle of optical pulse reflectometer 10 according to the present invention.

As shown in FIG. 1, the light pulses emitted by laser diode 30 are directed via input port 42 of the 2×2 directional coupler to output port 44. The 2×2 directional coupler 40 must, for the duration of each test pulse, be switched in such a manner that the entire light signal leaves the 2×2 directional coupler 40 at output port 44 and is injected more or less without loss into test fiber 60. For this purpose, the 2×2 directional coupler 40 is switched to the "straight-ahead" state, as shown in FIG. 2. Immediately after the light pulse has completely propagated through strand 41, the 2×2 directional coupler 40 is switched to the crossed-over state, as shown in FIG. 3. In this state, the reflection signal caused by test fiber 60 and delayed in launching fiber 50 is transferred via port 44 (now acting as an input) of strand 41 to the other strand 43. The reflection signal leaves the 2×2 directional coupler 40 at port 46 and is directed to photodetector 70. To ensure that all the test pulses reflected by test fiber 60 are passed to photodiode 70 and can be evaluated by optical pulse reflectometer 10, the test pulse must have completely passed through the 2×2 directional coupler 40 before the 2×2 directional coupler 40 can be switched from the straight-ahead state to the crossed-over state. For this purpose, launching fiber 50 is inserted between the optically switchable 2×2 coupler 40 and the test fiber 60. Launching fiber 50 delays the echo pulse until the 2×2 directional coupler 40 has been switched. The length of launching fiber 50 should therefore be $1 \geq cT$, where c is the speed of the light in launching fiber 50 and T is the longest pulse duration of a pulse which can be emitted by laser diode 30. Usually, the duration of a light pulse emitted by laser diode 30 will be 10 ns to 10 µs. The mark-to-space ratio is, for example, approximately 1:1000. In this manner, each echo pulse reaches photodetector 70 as an undistorted pulse and can be used to measure the attenuation and reflection profile of test fiber 60, and can be displayed on oscilloscope 90. Furthermore, the use of launching fiber 50 makes it possible to reliably prevent any light components reflected in the test fiber 60 from being returned to laser diode 30.

Instead of pulsed laser diode 30, it is also possible to employ a laser diode which is operated in constant light mode, light pulses being produced in this case in the optical switch. In the case of the described 2×2 coupler 40, the constant light of laser diode 30 is, for this purpose, for the duration of a test pulse, directed in the straight-ahead state to test fiber 60. After the desired pulse duration, stored, for example, in the control device, comes to an end, the 2×2 coupler 40 is switched to the crossed-over state. The constant light, still emitted by laser diode 30, is directed to port 48 and is more or less completely attenuated in the connected absorber. At the same time, the light reflected by test fiber 60 because of Rayleigh scattering and Fresnel reflections is directed to photodetector 70 and is then, as already described, processed and displayed.

The improved power utilization of optical pulse reflectometer 10 according to the present invention is accomplished in that, on both the outward and return travel of a pulse, by suitably selecting the instant of switching of optical switch 40, there are no longer any structural, i.e., process-induced, power losses, as is the case with static power splitters. Consequently, the entire optical power received at a port of the 2×2 coupler 40 is switched through more or less unattenuated to only one port at a time on the opposite side. This is true both when the test pulse is emitted and also when the reflected components are returned.

The controlled or adjusted variable in currently common and technically well-controlled versions of switchable 2×2 directional couplers is very often an electric voltage. The therewith associated electric field permits the use of the Pockels effect (linear electro-optical effect). Switchable optical 2×2 directional couplers can be implemented in integrated optical design in a variety of versions (waveguide structure-material composition). Furthermore, there is the possibility of monolithic integration with laser diode 30 of optical pulse reflectometer 10. An alternative embodiment of a switchable optical switch for the free-beam guiding of the light may include a plate, which is coated on both sides and whose reflectivity can, for example, be electrically adjusted between virtually full transparency during the emission of the test pulse and virtually complete reflection during the reception of the reflections from test fiber 60.

What is claimed is:

1. An optical pulse reflectometer comprising:
   at least one light source operating in a constant light mode;
   at least one test object;
   at least one photodetector;
   an indication device connected downstream of an output of the at least one photodetector;
   at least one optical switch for selectively connecting the light source to the at least one test object and the at least one test object to the at least one photodetector; and
   a control device for driving the at least one optical switch so as to produce light pulses having a predefined frequency and duration.

2. The optical pulse reflectometer as recited in claim 1 wherein the at least one light source is a laser diode.

3. The optical pulse reflectometer as recited in claim 1 wherein the at least one test object is an optical fiber.

4. The optical pulse reflectometer as recited in claim 1 wherein the at least one optical switch is at least one of a 2×2 directional coupler and an acousto-optical modulator.

5. The optical pulse reflectometer as recited in claim 4 wherein an unused port of the at least one optical switch is terminated with a light shielding and absorption device.

6. The optical pulse reflectometer as recited in claim 1 further comprising a launching fiber having a predetermined length, the launching fiber being connected upstream of the at least one test object.

7. The optical pulse reflectometer as recited in claim 1 further comprising a Boxcar averager and a logarithm converter connected between the at least one photodetector and the indication device.

\* \* \* \* \*